(No Model.)　　　　　L. J. KNOWLES.　　　2 Sheets—Sheet 1.
SHAFT BEARING FOR LOOMS.
No. 300,483.　　　　　　　　Patented June 17, 1884.
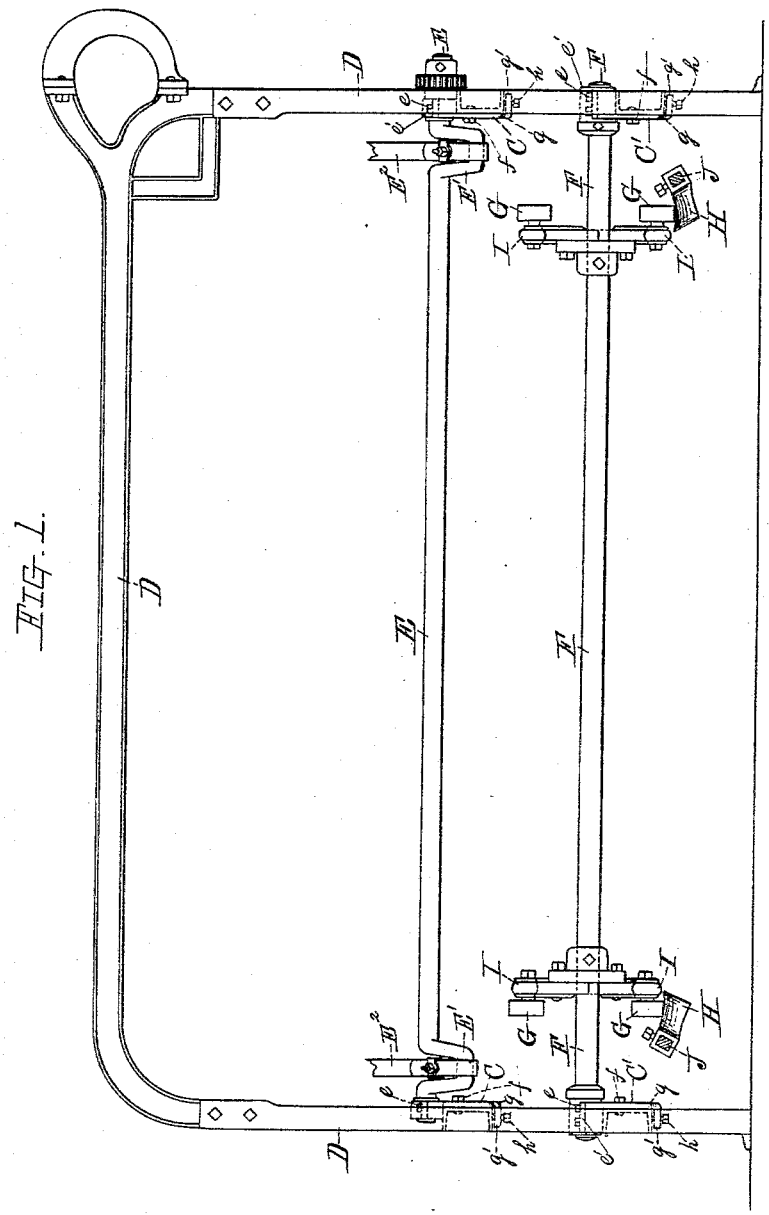
Witnesses,
H. H. Cunningham
Albert A. Barker
Inventor,
Lucius J. Knowles

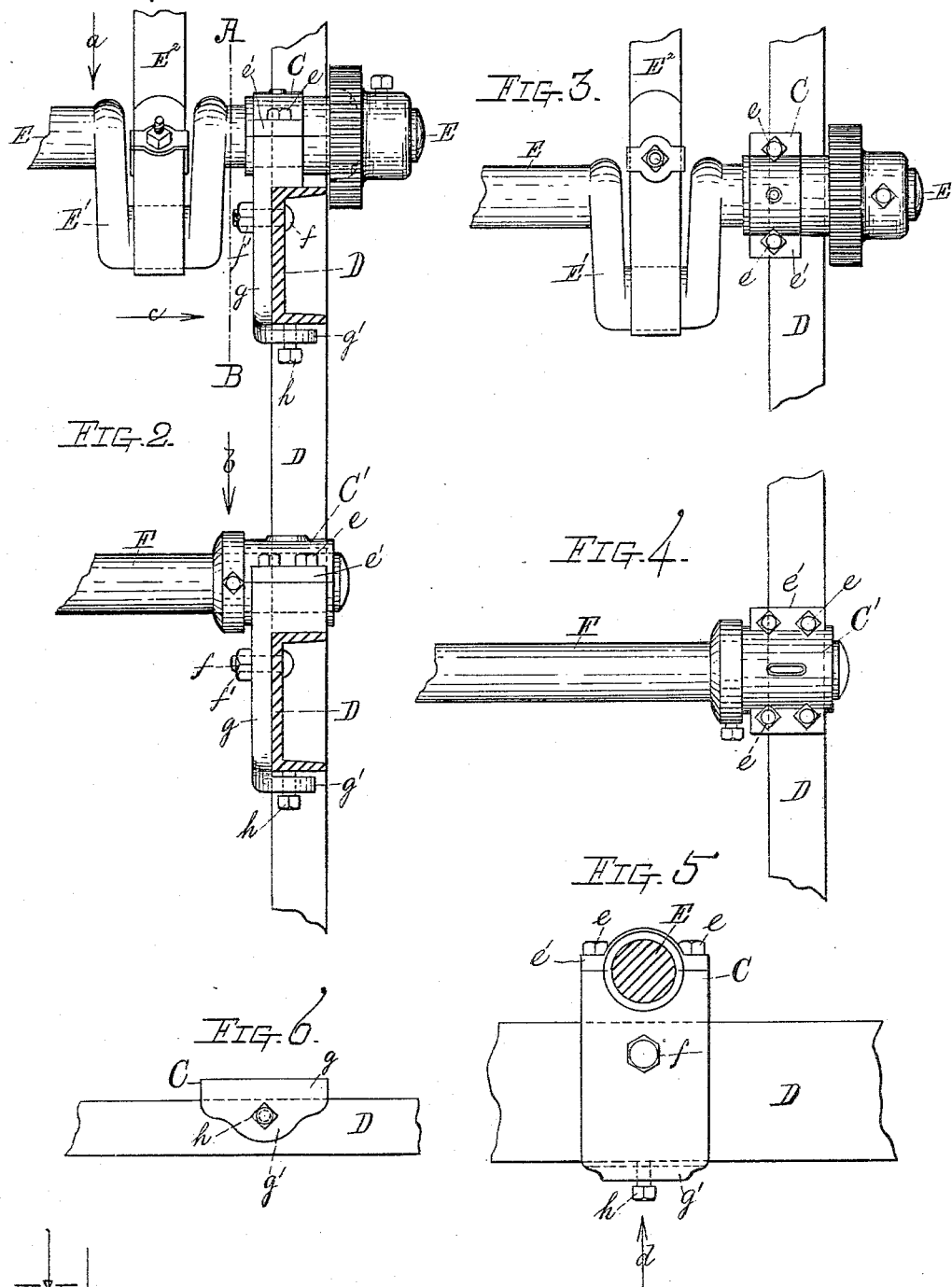

UNITED STATES PATENT OFFICE.

LUCIUS J. KNOWLES, OF WORCESTER, MASSACHUSETTS.

SHAFT-BEARING FOR LOOMS.

SPECIFICATION forming part of Letters Patent No. 300,483, dated June 17, 1884.

Application filed July 16, 1881. (No model.)

*To all whom it may concern:*

Be it known that I, LUCIUS J. KNOWLES, of Worcester, in the county of Worcester and State of Massachusetts, have invented certain new and useful Improvements in Shaft-Bearings for Looms; and I do hereby declare that the following is a full, clear, and exact description of the same, reference being had to the accompanying drawings, forming a part of this specification, and in which—

Figure 1 represents a side view of a loom-frame, showing the crank-shaft and shaft which operates the picker-shafts and staffs supported in my aforesaid improved bearings, as will be hereinafter more fully described. Fig. 2 represents a vertical section through a part of the loom-frame, showing a side view of two of my aforesaid bearings with the ends of the crank-shaft and lower or "bottom" shaft of the loom supported in said bearings. This figure, as well as all the succeeding ones, is shown upon an enlarged scale. Fig. 3 represents a top or plan view of the bearing for the crank-shaft, looking in the direction of arrow *a*, Fig. 2. Fig. 4 represents a top or plan view of the bearing for the bottom shaft, which operates the picker-shaft and staffs, looking in the direction of arrow *b*, Fig. 2. Fig. 5 represents a vertical section through the crank-shaft, taken on line A B, Fig. 2, looking in the direction indicated by arrow *c*, showing a side view of the bearing which supports the end of said crank-shaft, as well as part of the loom-frame to which the bearing is secured; and Fig. 6 represents a bottom view of the bearing shown in Fig. 5, looking in the direction of arrow *d*.

My invention relates to the bearings employed for supporting the ends of the crank and bottom shafts of a loom, and the means for fastening said bearings to the loom-frame.

It consists in the combination of a bearing having a detachable cap and clamping arms, and a set-screw, with the loom-frame and a loom-shaft, as hereinafter more fully set forth.

To enable those skilled in the art to which my invention belongs to make and use the same, I will proceed to describe it more in detail.

The bearings C C', which are provided with detachable cap-pieces $e'$, (shown in the drawings,) with the exception of their lower parts, are the same or similar in construction and arrangement to others now in use, and therefore such old parts do not require a detailed description. The old method of fastening the bearings to the loom-frame has been to pass bolts *f* through downwardly-projecting flanges into the side of the loom-frame. This manner of fastening has proven unsatisfactory. Although said bearings when thus fastened are held quite firmly for a time, they will soon by the jarring motion of the loom become loose upon the frame. By my method of fastening the bearings, as hereinafter described, they are rigidly held, and will remain in that condition for an indefinite length of time. The bolts *e* simply serve the purpose of holding the cap-pieces $e'$ in position. It will be understood that the crank-shaft E operates the lathe of the loom by means of cranks E' and crank-arms $E^2$, while the bottom shaft, F, operates the mechanism which knocks the shuttles back and forth in the operation of weaving.

I represents the picker-cams which are secured upon shaft F; G, the picker-rolls which are pivoted upon said cams; and H, the picker-shoes, which are operated by the rolls G striking them when the loom is in operation. The purpose, as will also be understood, of the picker-cams and their rolls, is to force down the picker-shoes at each half-revolution of shaft F, thereby giving a rocking motion to the picker-shafts J, so as to swing the picker-arm secured to said shafts at their opposite ends, and thus knock the shuttles back and forth from one shuttle-box to the other when the loom is in operation.

My improvements upon the bearings C C' consist in extending the flanges before described down, to form clamping-arms *g*, and of fastening said clamping-arms to the loom-frame by passing set-screws *h* through the lower bent parts, $g'$, of said arms, which bear against the under side of the frame, as is fully shown in the drawings.

Those skilled in the art to which my invention appertains will readily perceive the practical advantages of fastening the crank and bottom shafts of a loom as hereinbefore described. It is especially desirable that the bearings for the bottom shaft shall be very firm and rigid owing to the strong intermittent strain which is brought to bear upon it in operating the shuttle mechanism.

The bearing C', as will be seen by the drawings, is a duplication of bearing C, and is shown and described simply to illustrate my invention applied to another similar part of the loom.

Having described my improvements in shaft-bearings for looms, what I claim therein as new, and of my invention, and desire to secure by Letters Patent, is—

The combination, with the loom-frame and a loom-shaft, of the bearing C, having a detachable cap, $e'$, clamping-arms $g\,g'$, and set-screw $h$, substantially as shown and described, for the purpose stated.

LUCIUS J. KNOWLES.

Witnesses:
H. H. MERRIAM,
ALBERT A. BARKER.